US009672368B2

(12) United States Patent
Bowden et al.

(10) Patent No.: US 9,672,368 B2
(45) Date of Patent: Jun. 6, 2017

(54) PROVIDING SELECTIVE CONTROL OF INFORMATION SHARED FROM A FIRST DEVICE TO A SECOND DEVICE

(71) Applicants: Upton Beall Bowden, Canton, MI (US); Theodore Charles Wingrove, Plymouth, MI (US); Anthony Joseph Ciatti, Ann Arbor, MI (US); Yanina Goncharenko, Wixom, MI (US)

(72) Inventors: Upton Beall Bowden, Canton, MI (US); Theodore Charles Wingrove, Plymouth, MI (US); Anthony Joseph Ciatti, Ann Arbor, MI (US); Yanina Goncharenko, Wixom, MI (US)

(73) Assignee: Visteon Global Technologies, Inc., Van Buren Township, MI (US)

( * ) Notice: Subject to any disclaimer, the term of this patent is extended or adjusted under 35 U.S.C. 154(b) by 0 days.

(21) Appl. No.: 14/266,406

(22) Filed: Apr. 30, 2014

(65) Prior Publication Data

US 2015/0317484 A1 Nov. 5, 2015

(51) Int. Cl.
*G06F 21/62* (2013.01)
*H04W 4/00* (2009.01)
*H04W 12/08* (2009.01)

(52) U.S. Cl.
CPC ............ *G06F 21/62* (2013.01); *H04W 4/008* (2013.01); *H04W 12/08* (2013.01)

(58) Field of Classification Search
CPC ........ G06F 21/62; H04W 12/08; H04W 4/008
See application file for complete search history.

(56) References Cited

U.S. PATENT DOCUMENTS

| 6,336,038 | B1 * | 1/2002 | Nojima et al. ................ 455/557 |
| 8,380,251 | B2 * | 2/2013 | Witkowski et al. .......... 455/563 |
| 8,467,770 | B1 * | 6/2013 | Ben Ayed ..................... 455/411 |
| 2003/0069874 | A1 * | 4/2003 | Hertzog ............... G06Q 10/109 |
| 2005/0138137 | A1 * | 6/2005 | Encarnacion ..... G06F 17/30887 709/217 |
| 2006/0236126 | A1 * | 10/2006 | Adams .................... G06F 21/60 713/193 |
| 2007/0169115 | A1 * | 7/2007 | Ko ....................... H04L 12/2803 717/174 |
| 2007/0279241 | A1 * | 12/2007 | Jung et al. .................. 340/691.6 |
| 2007/0298767 | A1 * | 12/2007 | Brown .................. G06F 21/305 455/411 |
| 2008/0268766 | A1 * | 10/2008 | Narkmon .............. H04W 48/02 455/1 |
| 2009/0096573 | A1 * | 4/2009 | Graessley ............. H04W 12/04 340/5.8 |
| 2009/0156126 | A1 * | 6/2009 | Willis .......................... 455/41.3 |

(Continued)

*Primary Examiner* — Joseph P Hirl
*Assistant Examiner* — Stephen Gundry
(74) *Attorney, Agent, or Firm* — Dickinson Wright PLLC

(57) ABSTRACT

A system and method for providing selective control of information shared from a first device to a second device. The system includes a connection detector to detect a short-range communication between the first device and the second device; a security setter to set or acquire a security setting; a disconnect detector to detect whether the short-range communication between the first device and the second device is terminated; and a wiper to perform data management of information shared via the short-range communication between the first device and the second device based on the security setting.

16 Claims, 7 Drawing Sheets

(56) References Cited

U.S. PATENT DOCUMENTS

| | | | |
|---|---|---|---|
| 2010/0211770 A1* | 8/2010 | Alrabady et al. | 713/150 |
| 2010/0304731 A1* | 12/2010 | Bratton | H04N 5/232 455/420 |
| 2011/0087385 A1* | 4/2011 | Bowden | B60W 50/085 701/2 |
| 2011/0113485 A1* | 5/2011 | Little | G06F 21/31 726/19 |
| 2011/0176675 A1* | 7/2011 | Hughes | H04L 9/0822 380/44 |
| 2012/0317194 A1* | 12/2012 | Tian | 709/204 |
| 2013/0035063 A1* | 2/2013 | Fisk | H04M 1/72572 455/410 |
| 2013/0217331 A1* | 8/2013 | Manente | 455/41.2 |
| 2013/0227648 A1* | 8/2013 | Ricci | 726/3 |
| 2013/0268997 A1* | 10/2013 | Clancy et al. | 726/1 |
| 2013/0268998 A1* | 10/2013 | Ko et al. | 726/3 |
| 2013/0304884 A1* | 11/2013 | Hymel | H04L 67/04 709/222 |
| 2014/0163774 A1* | 6/2014 | Demeniuk | G08C 17/02 701/2 |
| 2014/0200740 A1* | 7/2014 | Lavi et al. | 701/2 |
| 2014/0248863 A1* | 9/2014 | Golsch | H04W 4/001 455/418 |
| 2014/0273955 A1* | 9/2014 | Oesterling | H04L 63/0853 455/411 |
| 2015/0005984 A1* | 1/2015 | De Los Santos | H04L 67/125 701/2 |
| 2015/0095156 A1* | 4/2015 | Sauerbrey et al. | 705/14.58 |
| 2015/0172849 A1* | 6/2015 | DeCusatis | H04W 4/008 709/219 |
| 2015/0281950 A1* | 10/2015 | Carr | H04W 12/02 455/411 |
| 2015/0347788 A1* | 12/2015 | Sobel | G06F 21/88 726/29 |
| 2015/0358471 A1* | 12/2015 | Roth | B60K 37/00 455/417 |

\* cited by examiner

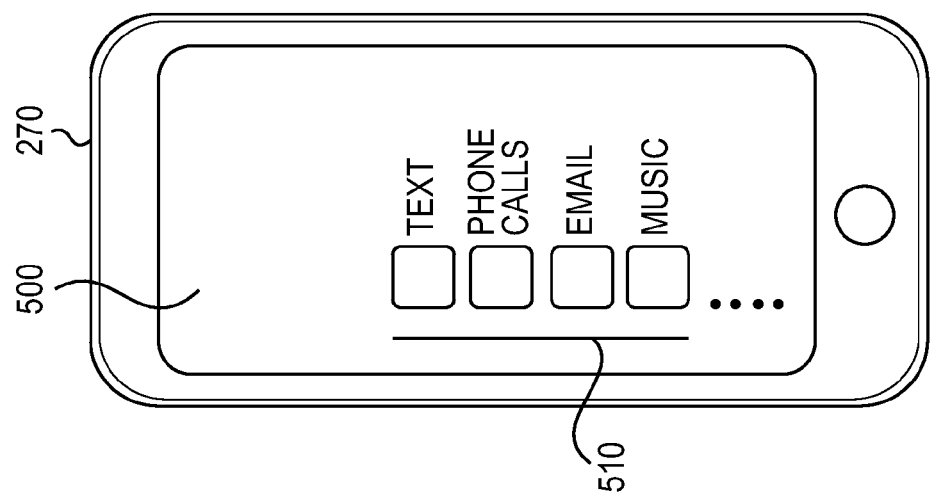

PROVIDING SELECTIVE CONTROL OF INFORMATION SHARED FROM A FIRST DEVICE TO A SECOND DEVICE

BACKGROUND

Electronic devices, such as, car audio systems, multimedia systems, and the like, are being configured to engage with portable and mobile electronic devices. For example, a mobile device may engage with the main electronic device, and by employing a short-range network connection, the mobile device may share information and control the electronic device.

By allowing an interaction such as the one described above, an operator may merge the operation and control of a static electronic device with a personal mobile device. Accordingly, the operation of the static electronic device becomes more interactive and configurable to an individual user's preference.

For example, a vehicle may have an infotainment system installed, and configured to remotely connect with a nearby mobile device. The nearby mobile device may be any sort of mobile device, such as, a smart phone, a laptop, a wearable watch, or the like. An infotainment system may be any electronic system capable of providing information and entertainment to a vehicle's driver or passenger. The services provided by the infotainment system are, but not limited to, a global position satellite (GPS) service, an audio player, a video player, a climate control system, or any sort of electronically engageable interface provided via a vehicular infotainment system.

A vehicle's driver may approach the infotainment system (for example, enter the vehicle), and engage a connection option to connect the nearby mobile device with the infotainment system. After engaging the connection option, the infotainment system may handshake with the nearby mobile device through various wireless connections. For example, the handshaking may occur via various connections, such as a Bluetooth™, near field communication, a localized local area network, Bluetooth™ Low Energy (BTLE), and the like. After which, the nearby mobile device may share information with the infotainment system in order to control the infotainment system. For example, if the infotainment system is capable of displaying and serving audio of text messages from the nearby mobile device, the infotainment system receives the text, and accordingly, displays or plays the text messages.

SUMMARY

A system and method for providing selective control of information shared from a first device to a second device. The system includes a connection detector to detect a short-range communication between the first device and the second device; a security setter to set or acquire a security setting; a disconnect detector to detect whether the short-range communication between the first device and the second device is terminated; and a wiper to perform data management of information shared via the short-range communication between the first device and the second device based on the security setting.

DESCRIPTION OF THE DRAWINGS

The detailed description refers to the following drawings, in which like numerals refer to like items, and in which:

FIG. 5 illustrates a GUI for setting a selective wiping of data in accordance with system or method.

DETAILED DESCRIPTION

Figure 1:
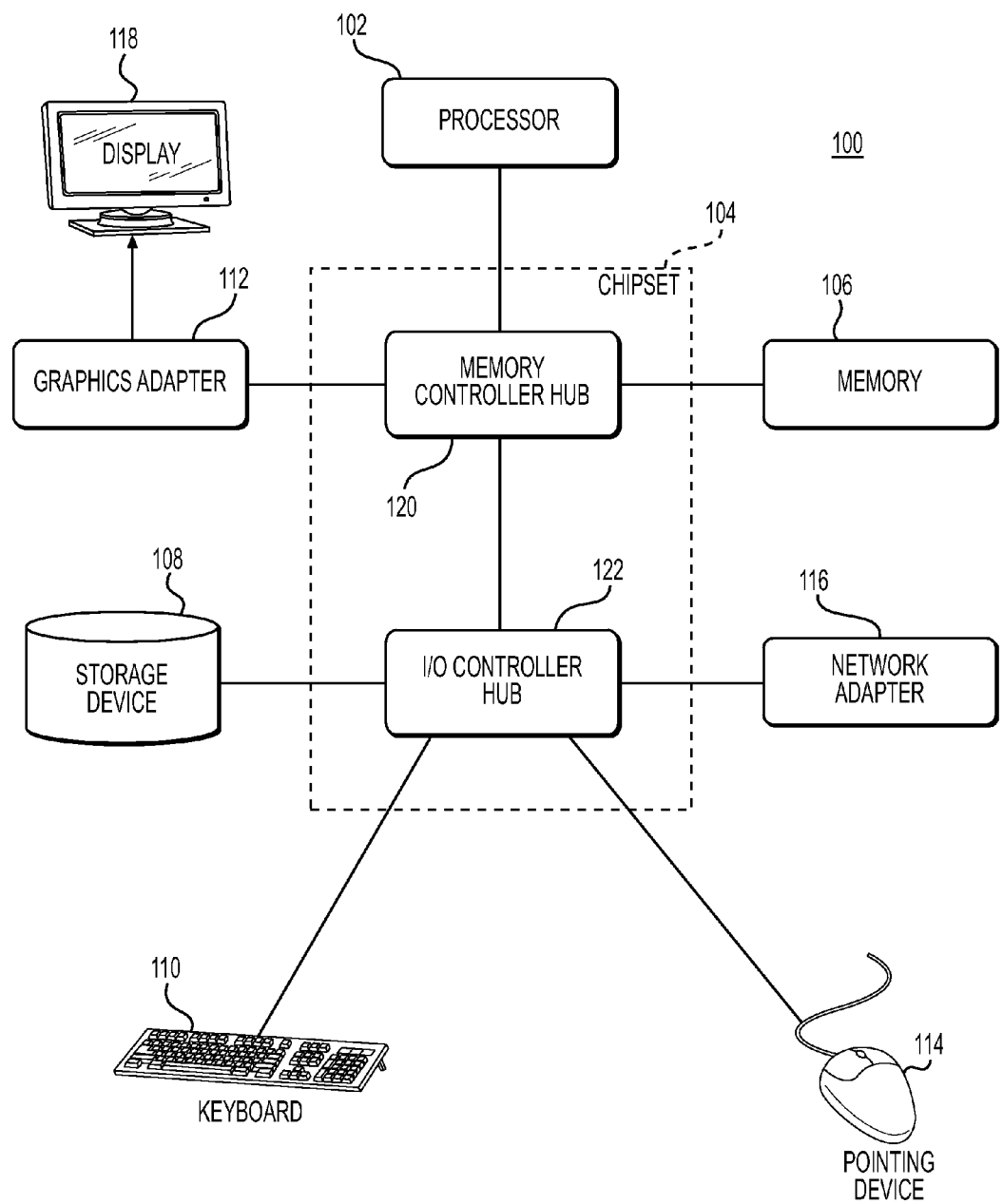
FIG. 1 is a block diagram illustrating an example computer.

The invention is described more fully hereinafter with references to the accompanying drawings, in which exemplary embodiments of the invention are shown. This invention may, however, be embodied in many different forms and should not be construed as limited to the embodiments set forth herein. Rather, these exemplary embodiments are provided so that this disclosure is thorough, and will fully convey the scope of the invention to those skilled in the art. It will be understood that for the purposes of this disclosure, "at least one of each" will be interpreted to mean any combination the enumerated elements following the respective language, including combination of multiples of the enumerated elements. For example, "at least one of X, Y, and Z" will be construed to mean X only, Y only, Z only, or any combination of two or more items X, Y, and Z (e.g. XYZ, XZ, YZ, X). Throughout the drawings and the detailed description, unless otherwise described, the same drawing reference numerals are understood to refer to the same elements, features, and structures. The relative size and depiction of these elements may be exaggerated for clarity, illustration, and convenience.

Various electronic systems may engage with each other via short-range communication techniques. For example, two or more electronic devices may handshake (or pair) with each other via a short-range communication technique, and share information and control with the other devices. In some examples, one of the electronic systems may be statically provided, while the other electronic system may be a mobile device typically carried by an operator associated with the first electronic system.

As explained in the background section, one such implementation is an infotainment system associated with a vehicle. The infotainment system may be installed in a cockpit (or other areas) of the vehicle. Once the vehicle's driver or passenger approaches the vehicle, the driver or passenger may initiate a connect option to handshake or pair the infotainment system with the mobile device.

To perform various operations, the mobile device and the infotainment system may share information. For example, the infotainment system may display information associated with various phone calls and text messages made by the mobile device. As such, the mobile device may share personal information associated with the driver or passenger to the infotainment system.

After the driver or passenger is finished interacting with the infotainment system, for example, after the driver or passenger leaves the vehicle, the connection between the infotainment system and mobile device may be terminated. However, the information shared between the mobile device and the infotainment system may still be maintained on the infotainment system.

This presents an undesirable situation for many mobile device users. The mobile device user may desire to not have their information stored on the infotainment system. In particular, the mobile device user may not desire to have personal or critical information shared with other infotainment users. For example, in the context of a vehicle, the vehicle may be used by multiple drivers. In this situation, the second driver may become privy to the personal information shared with the infotainment system via a previous mobile device user's interaction.

Disclosed herein are methods and systems for providing selective control of information shared from a first device to a second device. By providing the selective control, a mobile device user is given a robust ability to control which information is shared with the second device, and which information is wiped out or not shared to other users who may engage with the second device.

FIG. 1 is a block diagram illustrating an example computer 100. The computer 100 includes at least one processor 102 coupled to a chipset 104. The chipset 104 includes a memory controller hub 120 and an input/output (I/O) controller hub 122. A memory 106 and a graphics adapter 112 are coupled to the memory controller hub 120, and a display 118 is coupled to the graphics adapter 112. A storage device 108, keyboard 110, pointing device 114, and network adapter 116 are coupled to the I/O controller hub 122. Other embodiments of the computer 100 may have different architectures.

The storage device 108 is a non-transitory computer-readable storage medium such as a hard drive, compact disk read-only memory (CD-ROM), DVD, or a solid-state memory device. The memory 106 holds instructions and data used by the processor 102. The pointing device 114 is a mouse, track ball, or other type of pointing device, and is used in combination with the keyboard 110 to input data into the computer 100. The pointing device 114 may also be a gaming system controller, or any type of device used to control the gaming system. For example, the pointing device 114 may be connected to a video or image capturing device that employs biometric scanning to detect a specific user. The specific user may employ motion or gestures to command the point device 114 to control various aspects of the computer 100.

The graphics adapter 112 displays images and other information on the display 118. The network adapter 116 couples the computer system 100 to one or more computer networks.

The computer 100 is adapted to execute computer program modules for providing functionality described herein. As used herein, the term "module" refers to computer program logic used to provide the specified functionality. Thus, a module can be implemented in hardware, firmware, and/or software. In one embodiment, program modules are stored on the storage device 108, loaded into the memory 106, and executed by the processor 102.

The types of computers used by the entities and processes disclosed herein can vary depending upon the embodiment and the processing power required by the entity. The computer 100 may be a mobile device, tablet, smartphone or any sort of computing element with the above-listed elements. For example, a data storage device, such as a hard disk, solid state memory or storage device, might be stored in a distributed database system comprising multiple blade servers working together to provide the functionality described herein. The computers can lack some of the components described above, such as keyboards 110, graphics adapters 112, and displays 118.

The computer 100 may act as a server (not shown) for the content sharing service disclosed herein. The computer 100 may be clustered with other computer 100 devices to create the server.

Figure 2:
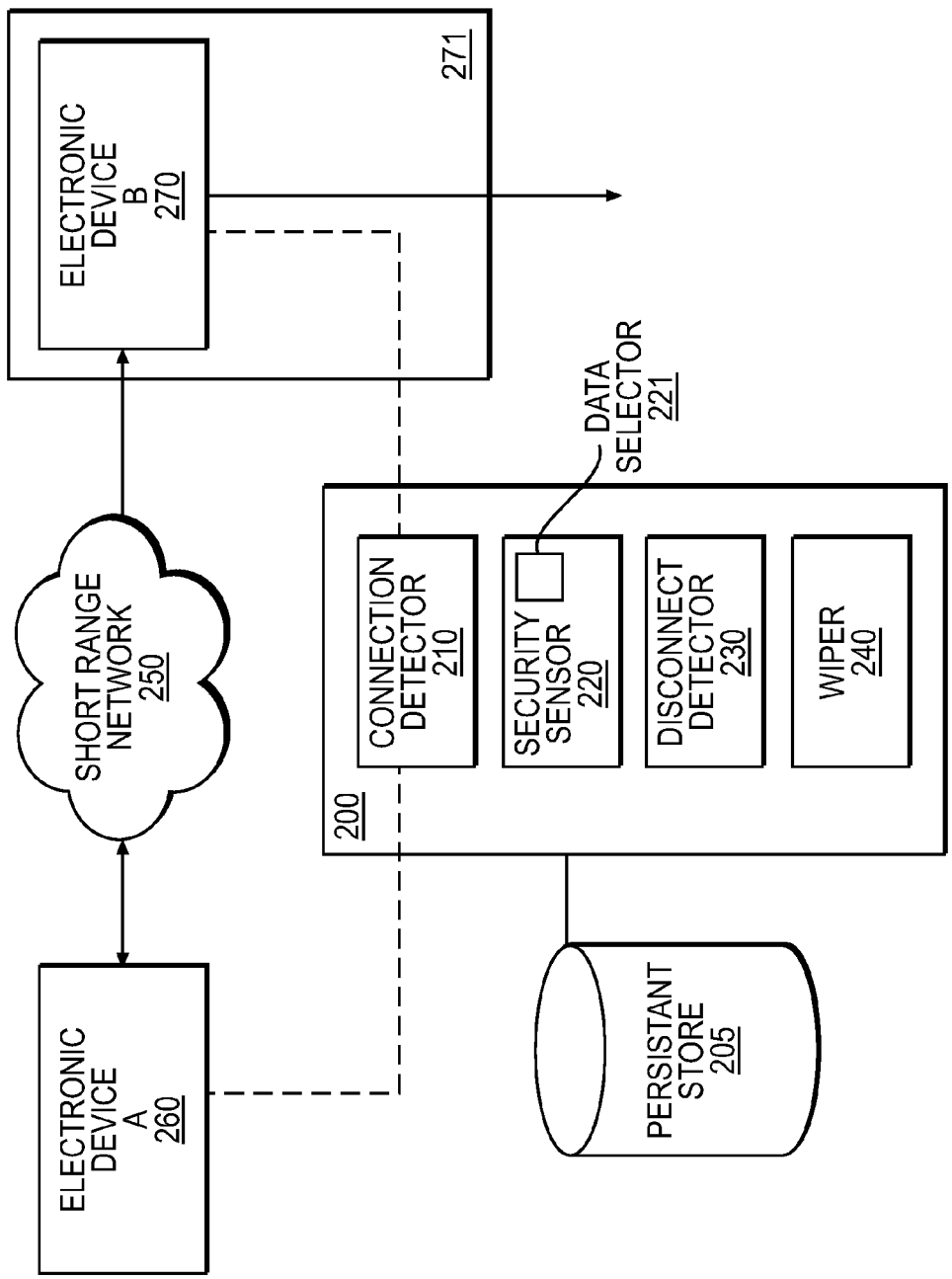
FIG. 2 is an example of a system for providing selective control of information shared from a first electronic device to a second electronic device.

FIG. 2 is an example of a system 200 for providing selective control of information shared from a first electronic device 260 to a second electronic device 270. The system 200 may be implemented on a device, such as computer 100. As shown in FIG. 2, an electronic device 260 and electronic device 270 are shown. The electronic device 260 and electronic device 270 may be any sort of electronic device capable of connecting via a short-range network 250, such as those enumerated in the Background section. System 200 may be implemented in either electronic device 260 or electronic device 270, or in a third-party device not shown. The third-party device may be any sort of router that permeates a short-range communication between two or more devices.

For example, in the context of a vehicle, electronic device 260 may be an infotainment system, while electronic device 270 may be a mobile device. A pairing (a.k.a. connection between two devices) may be initiated from either the electronic device 260 or electronic device 270. Accordingly, a command is initiated via network 250 to request the pairing.

The connection detector 210 detects that a connection between an electronic device 260 and an electronic device 260 is made. For example, a user associated with the electronic device 270 may instigate a Bluetooth™ pairing with the electronic device 260. For example, electronic device 260 may be an infotainment system of a vehicle, while electronic device 270 may be a mobile device associated with a passenger or a driver of a vehicle. The passenger or driver of the vehicle may want to interface electronic device 270 with electronic device 260 in order to control certain data and applications with the user interface associated with electronic device 260. For example, the passenger or driver may request to share music, perform mobile messaging, interface a global positioning satellite, or the like with the vehicle associated with electronic device 260.

The security setter 220 retrieves a setting associated with electronic device 270's sharing of information with electronic device 260. The setting may be retrieved from a persistent store 205, and thus previously known or configured for a default user or the specific user associated with electronic device 270. Alternatively, a GUI selection menu may be communicated to either electronic device 260 or electronic device 270 (or both), prompting a user for a desired level of security. An example GUI is shown in FIGS. 3(a) and 3(b).

For example, various settings may be selected or retrieved. A user may select to not do anything. In this case, the status quo of sharing is maintained. In an alternate example, the user may select an option of wiping data. In this case, which will be explained in greater detail below, data is wiped when the electronic device 270 disconnects with the electronic device 260. In another alternate example, the data may be locked. In this case, the user of electronic device 270 may preset a password associated with the pairing of electronic device 260 and electronic device 270, and accordingly, lock the data shared to electronic device 260 until an authentication process is successfully performed.

The security setter 220 may include a data selector 221. The data selector 221 may present via the GUI presented to the user, a selectable screen allowing a user to select the type of data to wipe and the type of data not to maintain. For example, the user may desire to not have certain type of data stored, such as text messages or voice mail, while having other types of data stored, such as music or videos. In this case, the data selector 221 may interact with the GUI or a predetermined setting to set the type of data that is wiped or protected.

The disconnect detector 230 detects that electronic device 260 and electronic device 270 are no longer connected with each via short-range communication network 250. The disconnect detector 230 may be instigated when electronic device 270's operator manually initiates a disconnect option. Alternatively, electronic device 270's operator may leave a physical area 271 in which electronic device 270 and electronic device 260 may communicate with each other.

The wiper 240, based on an indication from the disconnect detector 230 performs an operation via electronic device 260 securitizing the information based on the settings either made or retrieved by the security setter 220.

Accordingly, the wiper 240 may do nothing, wipe all personal data (or a pre-configured type of data) from the electronic device 260, or lock the information in the persistent store 205. Thus, when the electronic device 270 is no longer in connection with electronic device 260 via the short-range communication network 250, the wiper 240 performs an action commensurate on the setting configured by the security setter 220.

Figure 3:
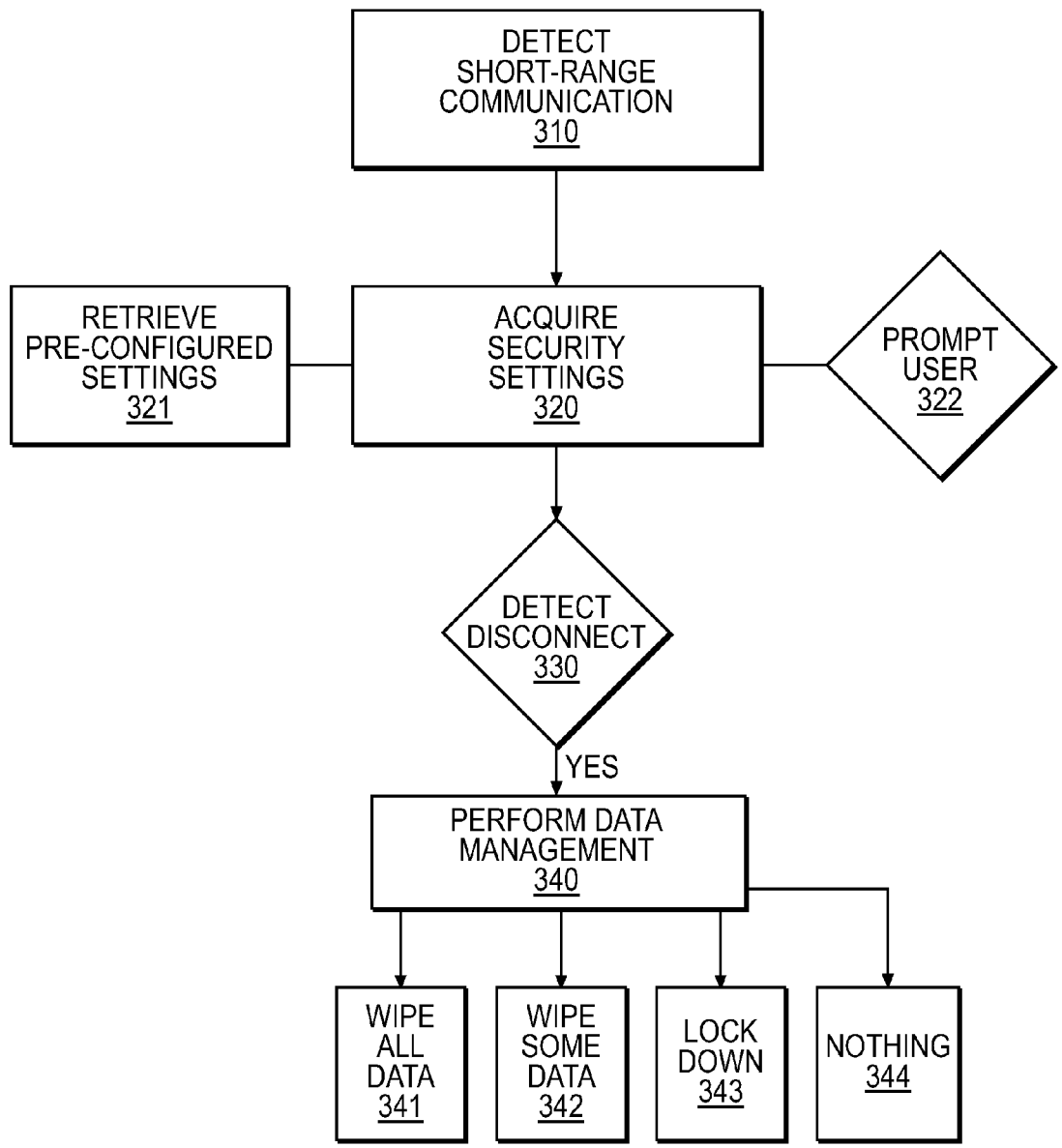
FIG. 3 is an example of a method for providing selective control of information shared from a first electronic device to a second electronic device.

FIG. 3 illustrates an example method 300 for providing selective control of information shared from a first electronic device to a second electronic device. The method 300 may be implemented on a device, such as system 200.

In operation 310, a detection of a short-range communication is made. The short-range communication may be any of the short-range communication techniques enumerated above, or known to one of ordinary skill in the art. For example, in the context of a vehicle, if a passenger enters the vehicle and interfaces a mobile device with an infotainment system via a Bluetooth™ connection, the connection via the Bluetooth™ may be detected.

In operation 320, a security settings associated with the connection may be acquired. The security setting indicates the amount of information stored on a secondary device, for example, the infotainment system.

The security setting may be retrieved via a pre-configured setting (operation 321), or alternatively or in addition to, an operator associated with the information being shared may be presented a GUI with available options (operation 322). The GUI may be presented either on a first or second device. The available options may range from wiping all data, wiping some data (with the categories of data being selected via an operator), locking data, or performing no action.

In operation 330, a determination of whether the short-range communication detected in operation 310 is terminated. If no, operation 330 may be performed iteratively at predetermined time intervals, or instigated by an action (for example, a device being turned off, a vehicle being exited, the devices no longer being within range of each other, or the like). If yes, method 300 proceeds to operation 340.

Additionally, in operation 330 a timeout may be additionally implemented. Accordingly, a second operation of determining when a disconnect is permanent may be added to method 300. This ensures that the disconnect is a permanent disconnect, and the first device and the second device are not merely disconnected for a temporary time period. For example, in the context of a mobile device being Bluetooth™ connected to an infotainment system, the mobile device holder may exit the vehicle to pay for gas or perform any other short term action. In this case, the operation 340 described below may not be necessary.

In operation 340, data management is performed. For example, the various types of data manipulation may occur: all data shared via a short-range communication technique may be wiped (341), some data shared via a short-range communication technique may be wiped (342), the data may be locked via the second device, i.e. the device in which information is shared to (343), or nothing may occur (344). Operations 341 through 344 may be performed based on the selection in operation 322 or a predetermined setting retrieved in operation 321.

In the case that some data is wiped (342), the data associated with certain applications or categories may be predetermined or selected via a GUI. An example of such a GUI is shown in FIG. 5.

In the case that data is locked (343), a password or authentication technique may be prompted to a user in a subsequent connection in order to access data shared via the short-range communication in a previous session.

Figure 4B:
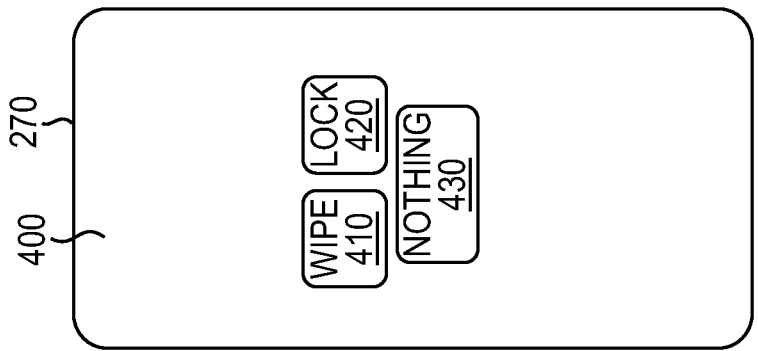
FIGS. 4(a) and (b) illustrate example implementations for a Graphical User Implementation (GUI) to implement the system or method described in FIGS. 2 and 3.
Figure 4A:
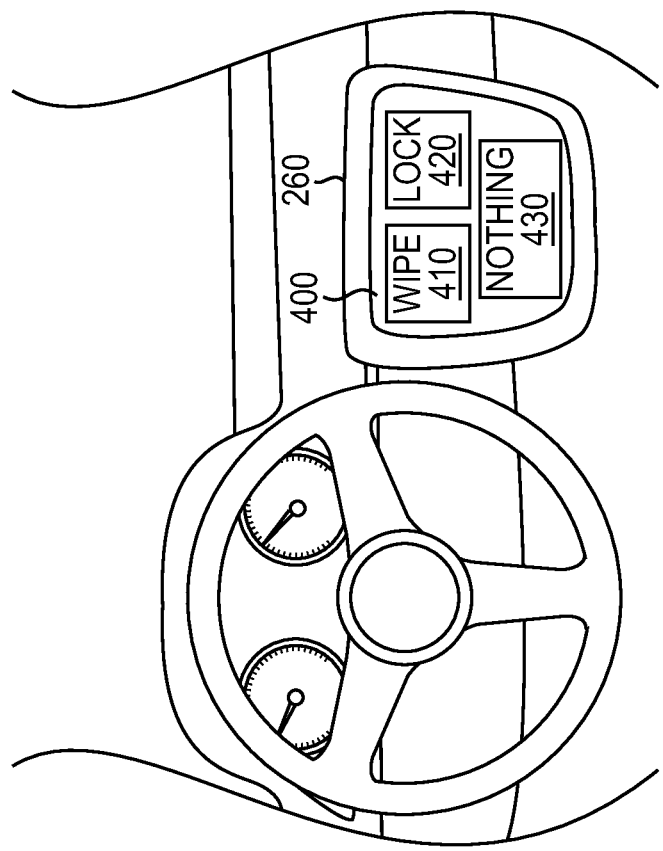

FIGS. 4(a) and (b) illustrate example implementations for a GUI 400 employed to implement the system 200 or method 300. In FIG. 4(a), the GUI 400 is implemented as part of an infotainment system. In FIG. 4(b), the GUI 400 is implemented as part of a mobile device.

In both cases, the GUI 400 presents an icon or selectable option for wiping 410, locking 420, or performing nothing 430. The GUI 400 may be presented after, during, or before a short-range communication is initiated between two devices. The wiping 410 may prompt the GUI 500 shown in FIG. 5.

FIG. 5 illustrates a GUI 500 for setting a selective wiping of data in accordance with system 200 or method 300. As shown in FIG. 5, various applications are presented (area 510). A user may select none, one, some, or all of the apps presented. For example, if the user selects text, when the method 300 performs operation 330, texts from a first device 260 is wiped/locked. In this way, a user can preselect information that the user deems as critical of worthy of wiping.

Depending on an implementer's preference, the GUI 400 may be presented via either device making a connection via the short-range communication technique. Thus, the security settings may be set at an infotainment system, an mobile device, or both. Alternatively, the setting of the security preferences may be omitted, and the systems and methods disclosed herein may employ predetermined or preset settings.

Figure 6A:
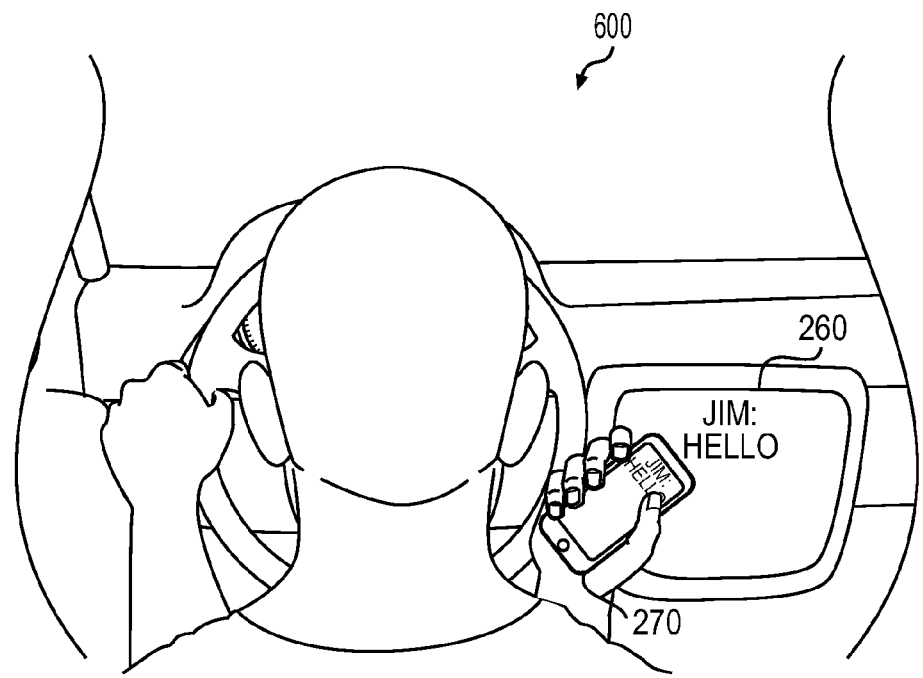
FIGS. 6(a) and 6(b) illustrate an example of a situation where system of FIG. 2 is not implemented.
Figure 6B:
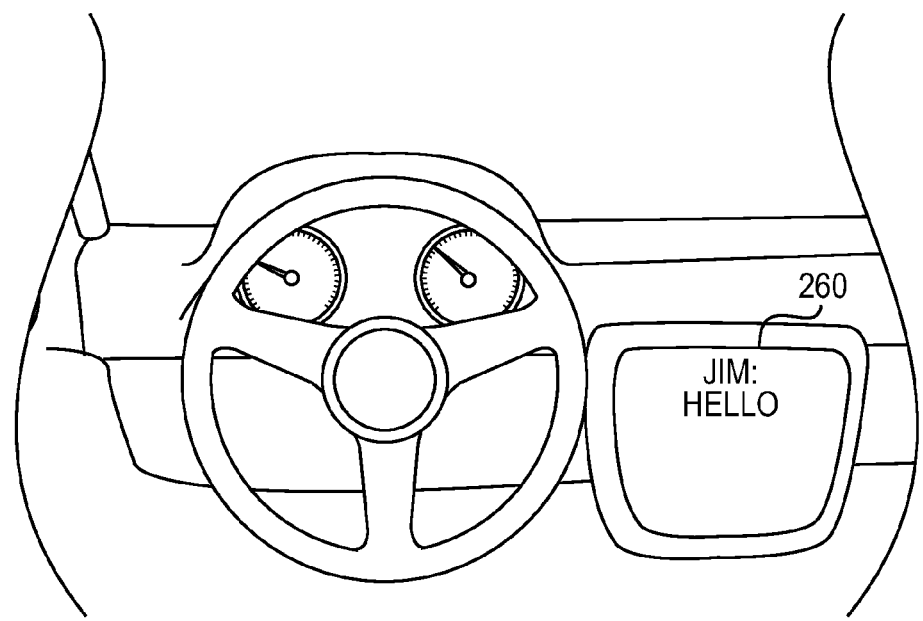
Figure 7A:
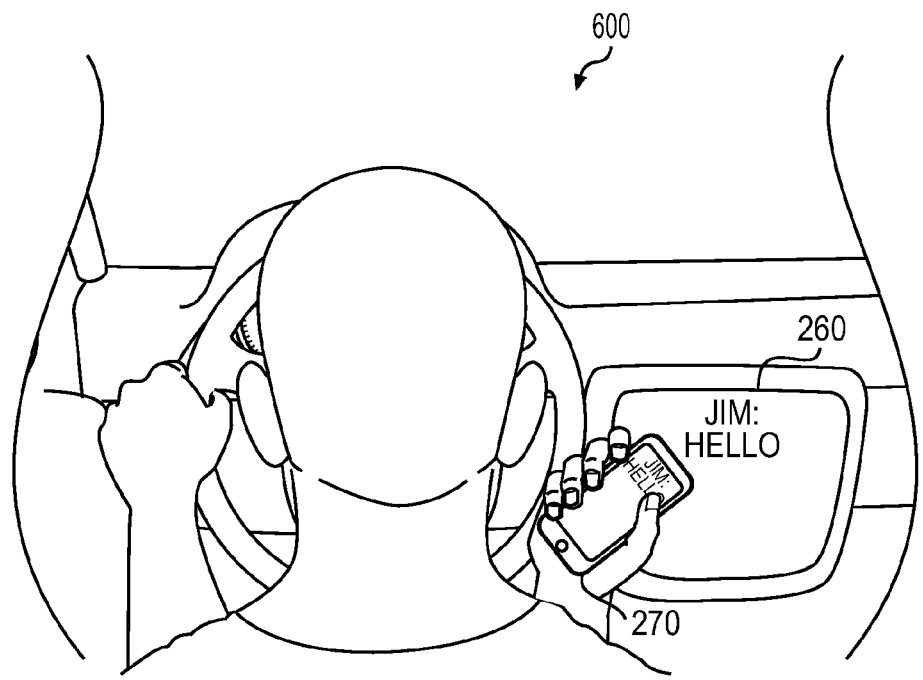
FIGS. 7(a) and 7(b) illustrate an example of a situation where system of FIG. 2 is implemented
Figure 7B:
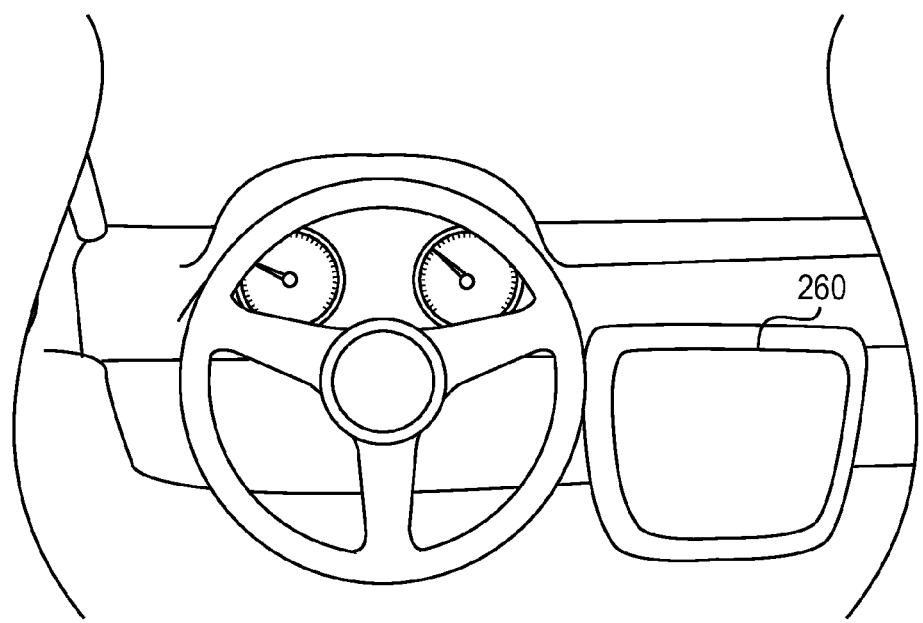

FIGS. 6(a) and 6(b) illustrate an example of a situation where system 200 or method 300 is not implemented. FIGS. 7(a) and 7(b) illustrate an example of a situation where system 200 or method 300 is implemented.

Referring to FIGS. 6(a) and 7(a), a passenger 600 connects a first electronic device 260 to a second electronic device 270 via a short-range communication. In the example shown, the first electronic device 260 is a mobile device, and the second electronic device 270 is an infotainment system. As shown in FIGS. 6(a) and 7(a), the contents of the second electronic device 270 (i.e. an incoming text message) is communicated and displayed on the first electronic device 260.

Referring to FIGS. 6(b) and 7(b), the passenger 600 leaves the vehicle, and takes electronic device 270 with them. As shown in FIG. 6(b), absent employing system 200, the text message shown in FIG. 6(a) still remains part of electronic device 260. In FIG. 6(b), the text message is shown, however, it may be stored in a memory or storage device associated with electronic device 260, and recalled at a later time.

In FIG. 7(b), presuming that a setting of wipe or lock was selected, the text message is deleted from the first electronic device 260. In this way, passenger 600 may properly ensure that data associated with the passenger's device (electronic device 270) is properly maintained and not shared to subsequent operators of electronic device 260. As shown in FIG. 7(b), the text no longer is display via the electronic device 260.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

We claim:

1. A system for providing selective control of information shared to a first device from a second device, the first device being an infotainment system and the second device being a mobile telephony device, comprising:
   a storage device comprising a non-transitory computer readable medium storing a program of instructions for the providing of selective control;
   a processor that executes the program of instructions;
   a connection detector to detect a short-range communication between the first device and the second device, the short-range communication being defined as a handshaking between the first device and the second device, with the information being shared from the second device to the first device being mobile received data associated with the second device, the information being content received from a network connection and displayable via the first device;
   a security setter to set or acquire a security setting;
   a disconnect detector to detect whether the short-range communication between the first device and the second device is terminated; and
   a wiper to perform data management of the information shared via the short-range communication to the first device from the second device based on the security setting,
   wherein the wiper is configured to automatically delete the information shared to the first device from the second device in response to the short-range communication being terminated as indicated by the disconnect detector.

2. The system according to claim 1, wherein the security setting is predetermined.

3. The system according to claim 1, wherein the security setting is set via the first device or the second device.

4. The system according to claim 3, wherein the security setter further comprises a data setter, the data setter selectively allowing a partial selection of data to wipe or lock.

5. The system according to claim 1, wherein based on the security setting being set to wipe all data, the wiper deletes all data shared between the first device to the second device via the short-range communication.

6. The system according to claim 3 wherein based on the security setting being set to wipe all data, the wiper deletes all data shared between the first device to the second device via the short-range communication.

7. The system according to claim 1, wherein based on the security setting being set to lock data, the wiper locks the data, and the system allows access to the data on a subsequent short-range communication session in response to successfully satisfying an authentication process.

8. The system according to claim 1, wherein the disconnect detector waits a predetermined time interval elapse to determine if the detected termination is still valid.

9. A method for providing selective control of information shared to a first device from a second device, the first device being an infotainment system and the second device being a mobile telephony device, comprising:
   detecting a short-range communication between the first device and the second device, the short-range communication being defined as a handshaking between the first device and the second device, with the information being shared from the second device to the first device being mobile received data associated with the second device, the information being content received from a network connection and displayable via the first device;
   acquiring a security setting;
   detecting whether the short-range communication between the first device and the second device is terminated; and
   performing data management of the information shared via the short-range communication to the first device from the second device based on the security setting, wherein the data management further comprises automatically deleting the information shared to the first device from the second device in response to the short-range communication being terminated as indicated by the disconnect detector,
   wherein at least one of the detecting, acquiring, or performing is performed by a processor.

10. The method according to claim 9, wherein the first device and the second device are associated with a vehicle.

11. The method according to claim 9, wherein the security setting is set via the first device or the second device.

12. The method according to claim 11, wherein the acquiring of security settings further comprises selectively allowing a partial selection of data to wipe or lock.

13. The method according to claim 9, wherein based on the security setting being set to wipe all data, deleting all data shared between the first device to the second device via the short-range communication.

14. The method according to claim 11, wherein based on the security setting being set to wipe all data, deleting all data shared between the first device to the second device via the short-range communication.

15. The method according to claim 9, wherein based on the security setting being set to lock data, locking the data, and allowing access to the data on a subsequent short-range communication session in response to successfully satisfying an authentication process.

16. The method according to claim 9, further comprising waiting a predetermined time interval elapse to determine if the detected termination is still valid.

* * * * *